United States Patent
Nishio

(10) Patent No.: US 11,999,200 B2
(45) Date of Patent: Jun. 4, 2024

(54) PNEUMATIC TIRE

(71) Applicant: The Yokohama Rubber Co., LTD., Tokyo (JP)

(72) Inventor: Koji Nishio, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 526 days.

(21) Appl. No.: 17/284,624

(22) PCT Filed: Oct. 7, 2019

(86) PCT No.: PCT/JP2019/039518
§ 371 (c)(1),
(2) Date: Apr. 12, 2021

(87) PCT Pub. No.: WO2020/090363
PCT Pub. Date: May 7, 2020

(65) Prior Publication Data
US 2021/0387484 A1    Dec. 16, 2021

(30) Foreign Application Priority Data
Nov. 2, 2018    (JP) .................................. 2018-207510

(51) Int. Cl.
*B60C 15/06*    (2006.01)
*B60C 15/00*    (2006.01)

(52) U.S. Cl.
CPC ...... *B60C 15/0635* (2013.01); *B60C 15/0009* (2013.01); *B60C 15/0603* (2013.01);
(Continued)

(58) Field of Classification Search
CPC . B60C 15/06; B60C 15/0603; B60C 15/0607; B60C 2015/061;
(Continued)

(56) References Cited

U.S. PATENT DOCUMENTS

2002/0153080 A1* 10/2002 Yamaguchi ......... B60C 15/0607
152/546
2004/0116574 A1* 6/2004 Sandstrom ................ C08L 9/06
524/495
(Continued)

FOREIGN PATENT DOCUMENTS

CN    103998260 A    8/2014
CN    104002618 A    8/2014
(Continued)

OTHER PUBLICATIONS

Machine Translation: JP-2017114454-A, Nishio K, (Year: 2023).*
(Continued)

*Primary Examiner* — Kendra Ly
(74) *Attorney, Agent, or Firm* — Thorpe North & Western

(57) ABSTRACT

In a pneumatic tire, a bead filler is radially outward of a bead core, a carcass turned up end is radially inward of an outer side end of the bead filler, the turned up end is spaced from a carcass body, a reinforcement layer is laterally outward of the bead filler, a sidewall rubber extends from a sidewall to the bead, an inner rubber reinforcing layer is between the bead filler and the reinforcement layer and adjacent to the turned up end, a crack suppression layer is between the reinforcement layer and the sidewall rubber, the crack suppression layer extends 5 mm or more from where the crack suppression layer overlaps, the reinforcement layer contacts the carcass body radially outwardly of the bead filler, and a 100% modulus $Kc_{M100}$ of the crack suppression layer is at least 1.5 times that of the sidewall rubber.

14 Claims, 8 Drawing Sheets

(52) U.S. Cl.
CPC .. *B60C 15/0628* (2013.01); *B60C 2015/0621* (2013.01); *B60C 2015/0625* (2013.01); *B60C 2015/065* (2013.01); *B60C 2015/066* (2013.01); *B60C 2015/0664* (2013.01); *B60C 2015/0678* (2013.01); *B60C 2015/0689* (2013.01); *B60C 2015/0692* (2013.01); *B60C 2200/06* (2013.01)

(58) Field of Classification Search
CPC .... B60C 2015/0614; B60C 2015/0617; B60C 2015/0621; B60C 2015/0625
See application file for complete search history.

(56) References Cited

U.S. PATENT DOCUMENTS

| | | | | |
|---|---|---|---|---|
| 2012/0318427 | A1* | 12/2012 | Nishio | B60C 15/0009 152/541 |
| 2014/0311650 | A1 | 10/2014 | Sugiyama et al. | |
| 2015/0367685 | A1 | 12/2015 | Takahashi | |
| 2016/0176242 | A1 | 6/2016 | Nakamata | |
| 2017/0015145 | A1* | 1/2017 | Tanaka | B60C 15/04 |
| 2017/0087941 | A1* | 3/2017 | Izuhara | B60C 15/04 |
| 2017/0217257 | A1 | 8/2017 | Todoroki | |
| 2018/0370295 | A1 | 12/2018 | Nishio | |
| 2019/0241025 | A1 | 8/2019 | Nishio | |
| 2020/0108676 | A1* | 4/2020 | Suita | G06K 19/07764 |

FOREIGN PATENT DOCUMENTS

| | | | | |
|---|---|---|---|---|
| CN | 104723804 | A | 6/2015 | |
| CN | 104936797 | A | 9/2015 | |
| CN | 105711347 | A | 6/2016 | |
| CN | 107020894 | A | 8/2017 | |
| CN | 108367635 | A | 8/2018 | |
| CN | 109843608 | A | 6/2019 | |
| DE | 102004059772 | A1 | 6/2006 | |
| EP | 2796300 | A1 | 10/2014 | |
| EP | 2944482 | A1 | 11/2015 | |
| EP | 3202595 | A1 | 8/2017 | |
| JP | S63-110006 | A | 5/1988 | |
| JP | 6-328914 | A | 11/1994 | |
| JP | 2005-112042 | A | 4/2005 | |
| JP | 2009143420 | A * | 7/2009 | |
| JP | 2010006322 | A * | 1/2010 | B60C 15/0607 |
| JP | 2013-129219 | A | 7/2013 | |
| JP | 2014-151755 | A | 8/2014 | |
| JP | 2014-162283 | A | 9/2014 | |
| JP | 2015116973 | A * | 6/2015 | |
| JP | 2017-114451 | A | 6/2017 | |
| JP | 2017114454 | A * | 6/2017 | B60C 1/0025 |
| JP | 2017-136910 | A | 8/2017 | |
| JP | 2018-69843 | A | 5/2018 | |
| WO | 2013/094300 | A1 | 6/2013 | |
| WO | 2014/122953 | A1 | 8/2014 | |
| WO | 2017/110635 | A1 | 6/2017 | |
| WO | 2018/079564 | A1 | 5/2018 | |

OTHER PUBLICATIONS

Machine Translation: JP-2009143420-A, Fukushima M, (Year: 2023).*
Machine Translation: JP-2015116973-A, Izumihara M, (Year: 2023).*
Machine Translation: JP-2010006322-A, Ito T, (Year: 2023).*

* cited by examiner

PNEUMATIC TIRE

TECHNICAL FIELD

The present technology relates to a pneumatic tire in which a carcass layer including steel cords is turned up around a bead core of each bead portion from a tire inner side to a tire outer side, and particularly relates to a pneumatic tire that can provide bead portions with improved durability.

BACKGROUND ART

In some heavy duty pneumatic tires used for trucks, buses, and the like, a carcass layer including a plurality of steel cords bunched together between a pair of bead portions is mounted and turned up around a bead core of each of the bead portions from a tire inner side to a tire outer side. In each bead portion, at least one organic fiber reinforced layer including a plurality of organic fiber cords bunched together may be disposed on an outer side in a width direction of a bead filler, in order to improve the durability of the bead portions (for example, see Japan Unexamined Patent Publication No. 1988-110006).

However, in a pneumatic tire having such a configuration, separation of an organic fiber reinforced layer originating from an end portion is likely to occur, which is a factor that reduces the durability of the bead portions. In this regard, separation is less likely to occur in a case where organic fiber cords constituting the organic fiber reinforced layer have a small inclination angle with respect to the tire circumferential direction. However, for example, in a case where the tire is molded using a molding method in which the organic fiber reinforced layer is mechanically turned up with the carcass layer, a radially outer side end portion of the organic fiber reinforced layer tends to have a large cord inclination angle, inducing separation.

Additionally, in a case where an organic fiber reinforced layer is embedded in the bead portion, an improper rubber flow and formation of rubber banks are likely to occur at or near the end portion of the organic fiber reinforced layer during vulcanization. Furthermore, in a case where a mold release agent and the like are trapped in a surface layer along with rubber due to the improper rubber flow or formation of rubber banks during vulcanization, this causes cracking during the initial traveling stage.

SUMMARY

The present technology provides a pneumatic tire that can provide bead portions with improved durability.

An embodiment of the present technology provides a pneumatic tire including a tread portion extending in a tire circumferential direction and having an annular shape, a pair of sidewall portions respectively disposed on both sides of the tread portion, a pair of bead portions each disposed on an inner side in a tire radial direction of the sidewall portions, and a carcass layer mounted between the pair of bead portions and including a plurality of steel cords, the carcass layer being turned up around a bead core of each of the bead portions from a tire inner side to a tire outer side, a bead filler being disposed on an outer circumference of the bead core of each of the bead portions, a turned up end portion of the carcass layer being disposed on a radially inner side with respect to a radially outer side end portion of the bead filler, the turned up end portion of the carcass layer being spaced apart from a body portion of the carcass layer, at least one organic fiber reinforced layer that includes a plurality of organic fiber cords being disposed on an outer side in a width direction of the bead filler in each of the bead portions, and a sidewall rubber layer exposed on a tire outer surface being disposed from the sidewall portion to the bead portion, an inner rubber reinforcing layer being disposed between the bead filler and the organic fiber reinforced layer and adjacent to the turned up end portion of the carcass layer, a crack suppression layer being disposed between the organic fiber reinforced layer and the sidewall rubber layer, the crack suppression layer extending toward a radially outer side from a position where the crack suppression layer overlaps, by 5 mm or more, the organic fiber reinforced layer located on an outermost side in the tire width direction and contacting the body portion of the carcass layer at a position on a radially outer side with respect to the radially outer side end portion of the bead filler, and a 100% modulus $Kc_{M100}$ of the crack suppression layer being at least 1.5 times as large as a 100% modulus $S_{M100}$ of the sidewall rubber layer.

In an embodiment of the present technology, the inner rubber reinforcing layer is disposed between the bead filler and the organic fiber reinforced layer and adjacent to the turned up end portion of the carcass layer, the crack suppression layer is disposed between the organic fiber reinforced layer and the sidewall rubber layer, the crack suppression layer extends toward the radially outer side from the position where the crack suppression layer overlaps, by 5 mm or more, the organic fiber reinforced layer located on the outermost side in the tire width direction and contacts the body portion of the carcass layer at the position on the radially outer side with respect to the radially outer side end portion of the bead filler, and the 100% modulus $Kc_{M100}$ of the crack suppression layer is set at least 1.5 times as large as the 100% modulus $S_{M100}$ of the sidewall rubber layer. Thus, the crack suppression layer suppresses an improper rubber flow or formation of rubber banks at or near an end portion of the organic fiber reinforced layer, allowing suppression, during the initial traveling stage, of cracking of a bead portion surface caused by the improper rubber flow or formation of rubber banks. Additionally, the crack suppression layer is disposed overlapping with the organic fiber reinforced layer located on the outermost side in the tire width direction, thus mitigating stress concentration at the radially outer side end portion of the organic fiber reinforced layer. This allows suppression of separation of the organic fiber reinforced layer originating from the radially outer side end portion. Furthermore, the radially outer side end portion of the organic fiber reinforced layer is sandwiched between the inner rubber reinforcing layer and the crack suppression layer, and thus even in a case where the tire is formed using a molding method that mechanically turns up the organic fiber reinforced layer with the carcass layer, a sudden increase in cord inclination angle at the radially outer side end portion of the organic fiber reinforced layer is suppressed, allowing suppression of separation of the organic fiber reinforced layer originating from the radially outer side end portion. Accordingly, the durability of the bead portions can be improved.

In an embodiment of the present technology, preferably, the 100% modulus $Kc_{M100}$ of the crack suppression layer ranges from 4.5 MPa to 10.0 MPa. Accordingly, the rubber flow during vulcanization is effectively suppressed, allowing suppression of cracking of a bead portion surface during the initial traveling stage.

Preferably, the crack suppression layer has an elongation at break $Kc_{EB}$ of 300% or more. This allows effective suppression of separation of the organic fiber reinforced layer originating from the radially outer side end portion.

Preferably, the crack suppression layer has a thickness $T_{KC}$ of from 2.0 mm to 6.0 mm in a region from the radially outermost end portion of the organic fiber reinforced layer to a position where the crack suppression layer contacts the body portion of the carcass layer. Accordingly, the rubber flow during vulcanization is effectively suppressed, allowing suppression of cracking of a bead portion surface during the initial traveling stage.

Preferably, in a tire meridian cross-section, in a region with a radius of 15 mm or less around the radially outermost end portion of the organic fiber reinforced layer, a maximum value $T_{max}$ and a minimum value $T_{min}$ of a total thickness of the crack suppression layer and the sidewall rubber layer satisfy a relationship $1.00 \leq T_{max}/T_{min} \leq 1.25$. Accordingly, a rubber gauge exhibits no local fluctuation at or near the radially outermost end portion of the organic fiber reinforced layer, making rubber less likely to be trapped during vulcanization. This allows suppression of cracking of the bead portion surface during the initial traveling stage.

Preferably, the inner rubber reinforcing layer contacts the body portion of the carcass layer at a position on the radially outer side with respect to the radially outer side end portion of the bead filler, the inner rubber reinforcing layer has a 100% modulus $Ki_{M100}$ of from 4.5 MPa to 10.0 MPa, and the inner rubber reinforcing layer has an elongation at break $Ki_{EB}$ of 300% or more. By thus extending the inner rubber reinforcing layer to the body portion of the carcass layer and specifying the 100% modulus $Ki_{M100}$ and the elongation at break $Ki_{EB}$ of the inner rubber reinforcing layer, stress concentration on the radially outer side end portion of the organic fiber reinforced layer is mitigated, allowing suppression of separation of the organic fiber reinforced layer originating from the radially outer side end portion.

Preferably, the inner rubber reinforcing layer has a thickness Tc of 2.0 mm or more at the turned up end portion of the carcass layer, and the inner rubber reinforcing layer has a thickness $T_N$ of 1.5 mm or more at the radially outermost end portion of the organic fiber reinforced layer. This mitigates stress concentration at the turned up end portion of the carcass layer and at the radially outermost end portion of the organic fiber reinforced layer, allowing separation originating from these end portions to be effectively suppressed.

Preferably, the organic fiber reinforced layer has a cord inclination angle β of from 15° to 45° with respect to the tire circumferential direction at the radially outer side end portion. This prevents an excessive increase in tension acting on the organic fiber reinforced layer, allowing suppression of separation of the organic fiber reinforced layer originating from the radially outer side end portion.

Preferably, the organic fiber reinforced layer has a tensile rigidity AN of from 15 kN/50 mm to 50 kN/50 mm. This allows effective suppression of separation of the carcass layer originating from the turned up end portion based on the reinforcing effect of the organic fiber reinforced layer.

Preferably, the organic fiber reinforced layer has a cord count $N_N$ of from 25 cords/50 mm to 45 cords/50 mm. This allows effective suppression of separation of the organic fiber reinforced layer originating from the end portion.

Preferably, the at least one organic fiber reinforced layer includes at least two organic fiber reinforced layers in which the organic fiber cords intersect one another, and a step width $W_N$ between end portions of the at least two organic fiber reinforced layers is 5 mm or more. This avoids stress concentration at the end portions of the organic fiber reinforced layers, allowing suppression of separation of the organic fiber reinforced layers originating from the end portions.

Preferably, a distance $P_h$ from a center of the bead core to the turned up end portion of the carcass layer ranges from 26.0 mm to 40.0 mm, a shortest distance $T_{BF}$ from the turned up end portion of the carcass layer to the body portion of the carcass layer is 11.0 mm or more, and a shortest distance $T_R$ from the organic fiber reinforced layer to an outer surface of the bead portion at the position of the turned up end portion of the carcass layer ranges from 6.0 mm to 12.0 mm. This allows effective suppression of separation of the carcass layer originating from the turned up end portion.

Preferably, a steel reinforced layer including a plurality of steel cords is disposed in each of the bead portions in such a manner as to wrap around the carcass layer, the bead core, and the bead filler, and a distance $P_h$ from the center of the bead core to the turned up end portion of the carcass layer and a distance $S_{ho}$ from the center of the bead core to the end portion of the steel reinforced layer satisfy a relationship $5.0 \text{ mm} \leq P_h - S_{ho}$. This mitigates stress concentration at the turned up end portion of the carcass layer and the end portion of the steel reinforced layer, allowing suppression of separation originating from these end portions.

Preferably, the bead filler includes a hard filler layer located on the radially inner side and a soft filler layer located on the radially outer side, the hard filler layer has a 100% modulus $B1_{M100}$ of from 6.0 MPa to 18.0 MPa, and the soft filler layer has a 100% modulus $B2_{M100}$ of from 1.0 MPa to 6.0 MPa. This allows effective suppression of separation of the carcass layer originating from the turned up end portion.

Preferably, the pneumatic tire according to an embodiment of the present technology has a load index of 121 or more on a single wheel, or a ply rating of 10 PR or more. Pneumatic tires having such a load index or ply rating are generally heavy duty tires. The present technology is expected to produce significant effects on heavy duty pneumatic tires.

In the present technology, the 100% modulus and the elongation at break are measured in accordance with JIS (Japanese Industrial Standard) K 6251.

DETAILED DESCRIPTION

Figure 1:
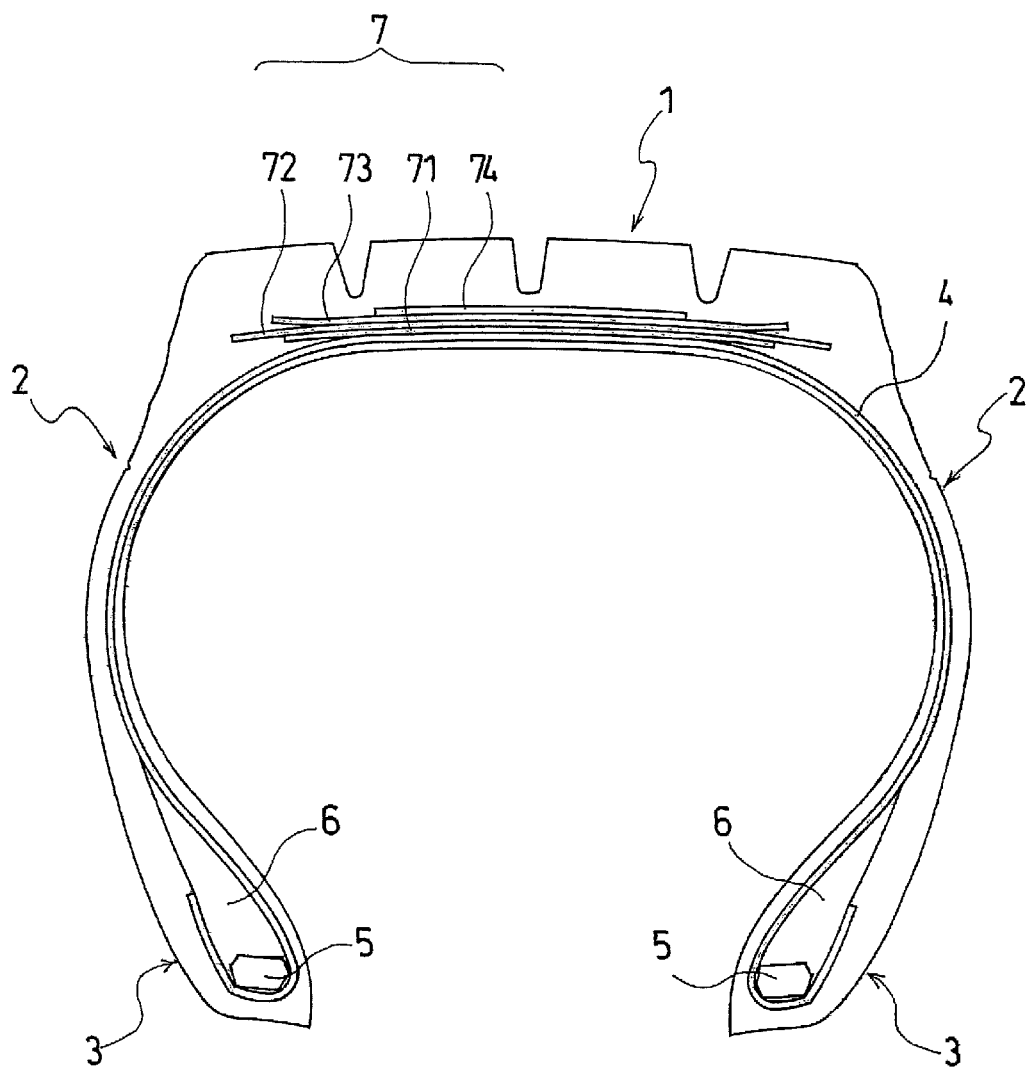
FIG. 1 is a meridian cross-sectional view illustrating a heavy duty pneumatic tire according to an embodiment of the present technology.
Figure 2:
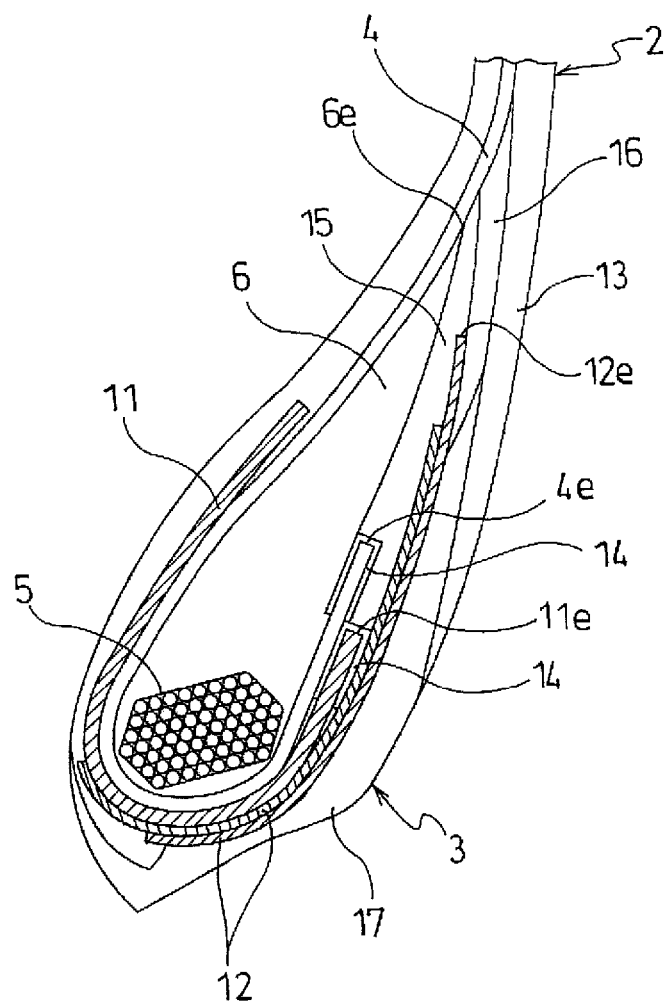
FIG. 2 is a cross-sectional view of a bead portion of the pneumatic tire in FIG. 1.
Figure 3:
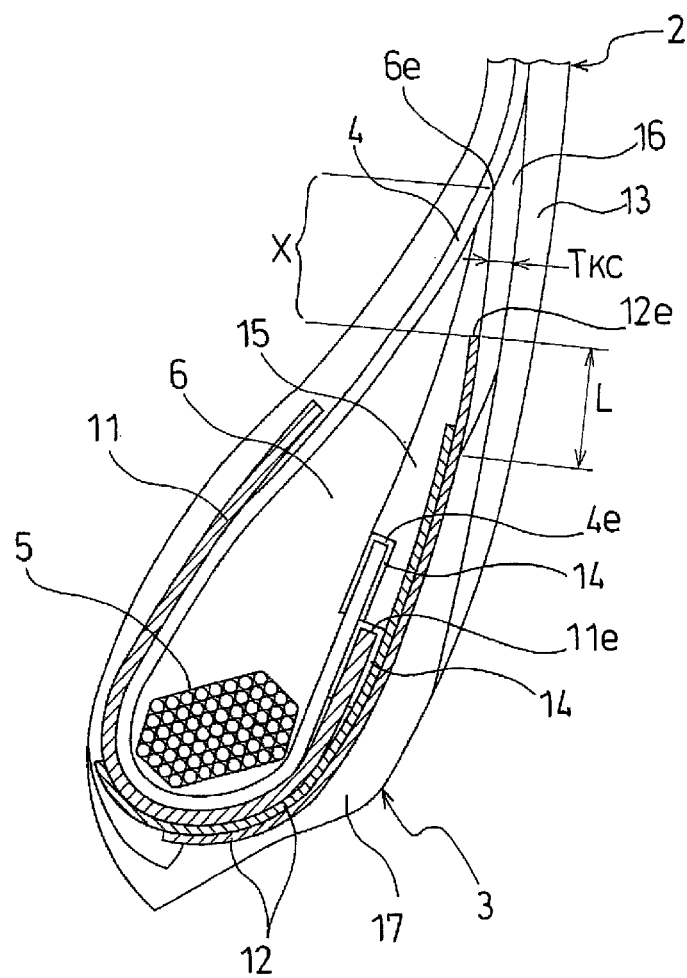
FIG. 3 is another cross-sectional view illustrating the bead portion of the pneumatic tire in FIG. 1.

Configurations of embodiments of the present technology will be described in detail below with reference to the accompanying drawings. FIG. 1 illustrates a heavy duty pneumatic tire according to an embodiment of the present technology, and FIG. 2 to FIG. 7 illustrate the main portion of the pneumatic tire.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed on an inner side of the sidewall portions 2 in the tire radial direction.

A carcass layer 4 is mounted between the pair of bead portions 3, 3. The carcass layer 4 includes a plurality of steel cords extending in the tire radial direction and is turned up around a bead core 5 disposed in each of the bead portions 3 from a tire inner side to a tire outer side. A bead filler 6 having a triangular cross-sectional shape and formed of a rubber composition is disposed on the outer circumference of the bead core 5.

Four belt layers 7 are embedded on the radially outer side of the carcass layer 4 in the tread portion 1. Each of the belt layers 7 includes a plurality of belt cords (steel cords) inclined with respect to the tire circumferential direction. The belt layers 7 include two central main belt layers 72 and 73 with belt cords intersecting with each other, and auxiliary belt layers 71 and 74 disposed on the radially inner side and the radially outer side of the main belt layers 72 and 73. The inclination angle of the belt cords constituting the main belt layers 72 and 73 with respect to the tire circumferential direction is set to range from 15° to 35°, for example, and the inclination angle of the belt cords constituting the auxiliary belt layers 71 and 74 with respect to the tire circumferential direction is set to range from 15° to 75°, for example.

In the pneumatic tire described above, as illustrated in FIG. 2, a turned up end portion 4e of the carcass layer 4 is disposed on the radially inner side of a radially outer side end portion 6e of the bead filler 6, that is, the turned up end portion 4e of the carcass layer 4 terminates in a middle portion of the bead filler 6. As a result, the turned up end portion 4e of the carcass layer 4 is spaced apart from the body portion of the carcass layer 4. Here, the turned up end portion 4e of the carcass layer 4 being spaced apart from the body portion of the carcass layer 4 means that the shortest distance $T_{BF}$ (see FIG. 7) from the turned up end portion 4e of the carcass layer 4 to the body portion of the carcass layer 4 is 8 mm or more. A steel reinforced layer 11 including a plurality of steel cords is disposed in each of the bead portions 3 in such a way as to wrap around the carcass layer 4, the bead core 5, and the bead filler 6. Additionally, at least one organic fiber reinforced layer 12 including a plurality of organic fiber cords is disposed on an outer side in a width direction of the bead filler 6 in each of the bead portions 3. Additionally, a sidewall rubber layer 13 exposed on the tire outer surface is disposed in a region extending from the sidewall portion 2 to the bead portion 3.

Additionally, an edge tape 14 made of rubber covers the turned up end portion 4e of the carcass layer 4 and an end portion 11e on an outer side in the width direction of the steel reinforced layer 11. The edge tape 14 is not necessarily required, but is effective from the perspective of separation prevention. The edge tape 14 has a thickness of from 0.5 mm to 1.8 mm and covers the metal cross section of the steel cord exposed at the turned up end portion 4e of the carcass layer 4 and the end portion 11e of the steel reinforced layer 11. The edge tape 14 preferably has an elongation at break of 300% or more and a 100% modulus of 5.0 MPa or more.

An inner rubber reinforcing layer 15 is disposed between the bead filler 6 and the organic fiber reinforced layer 12 and adjacent to the turned up end portion 4e of the carcass layer 4 and the end portion 11e of the steel reinforced layer 11. The inner rubber reinforcing layer 15 extends toward the radially outer side along the bead filler 6 and contacts the body portion of the carcass layer 4 at a position on the radially outer side with respect to the radially outer side end portion 6e of the bead filler 6. A crack suppression layer 16 formed of a rubber composition is disposed between the organic fiber reinforced layer 12 and the sidewall rubber layer 13. The crack suppression layer 16 extends toward the radially outer side from a position where the crack suppression layer 16 overlaps, by 5 mm or more, the organic fiber reinforced layer 12 located on the outermost side in the tire width direction, and contacts the body portion of the carcass layer 4 at a position on the radially outer side with respect to the radially outer side end portion 6e of the bead filler 6. In other words, the amount of overlap L (see FIG. 3), in the tire radial direction, between the crack suppression layer 16 and the organic fiber reinforced layer 12 is set to 5 mm or more, and the crack suppression layer 16 covers the radially outer side end portion 12e of the organic fiber reinforced layer 12. Additionally, a rim cushion rubber layer 17 is disposed at the positions of the bottom surface and the back surface of the bead portion 3, and the rim cushion rubber layer 17 extends between the organic fiber reinforced layer 12 and the sidewall rubber layer 13 and connects to the crack suppression layer 16. The 100% modulus $Kc_{M100}$ of the crack suppression layer 16 is set at least 1.5 times and preferably at least 1.7 times as large as the 100% modulus $S_{M100}$ of the sidewall rubber layer 13.

According to the pneumatic tire described above, the inner rubber reinforcing layer 15 is disposed between the bead filler 6 and the organic fiber reinforced layer 12 and adjacent to the turned up end portion 4e of the carcass layer 4, the crack suppression layer 16 is disposed between the organic fiber reinforced layer 12 and the sidewall rubber layer 13, the crack suppression layer 16 extends toward the radially outer side from the position where the crack suppression layer 16 overlaps, by 5 mm or more, the organic fiber reinforced layer 12 located on the outermost side in the tire width direction, and contacts the body portion of the carcass layer 4 at the position on the radially outer side with respect to the radially outer side end portion 6e of the bead filler 6, and the 100% modulus $Kc_{M100}$ of the crack suppression layer 16 is set at least 1.5 times as large as the 100% modulus $S_{M100}$ of the sidewall rubber layer 13. This suppresses an improper rubber flow or formation of rubber banks at or near the end portion of the organic fiber reinforced layer 12, allowing suppression, during the initial traveling stage, of cracking of the bead portion surface caused by the improper rubber flow or formation of rubber banks.

Additionally, because the crack suppression layer 16 is disposed overlapping with the organic fiber reinforced layer 12 located on the outermost side in the tire width direction, stress concentration at the radially outer side end portion 12e of the organic fiber reinforced layer 12 is mitigated, allowing suppression of separation of the organic fiber reinforced layer 12 originating from the radially outer side end portion 12e. Furthermore, because the radially outer side end portion 12e of the organic fiber reinforced layer 12 is sandwiched between the inner rubber reinforcing layer 15 and the crack suppression layer 16, even in a case where the tire is molded using a molding method in which the organic fiber reinforced layer 15 is mechanically turned up together with the carcass layer 4, a sudden increase in the cord inclination angle of the radially outer side end portion 12e of the organic fiber reinforced layer 12 is suppressed, allowing suppression of separation of the organic fiber reinforced layer 12 originating from the radially outer side end portion 12e. By thus suppressing cracking caused by an improper rubber flow or formation of rubber banks at or near the end portion of the organic fiber reinforced layer 12 and inhibiting separation of the organic fiber reinforced layer 12 originating from the radially outer side end portion 12e, the durability of the bead portions can be improved.

When the amount of overlap L, in the tire radial direction, of the crack suppression layer 16 and the organic fiber reinforced layer 12 is less than 5 mm, the covered region of the organic fiber reinforced layer 12 is excessively small, preventing sufficient mitigation of the stress concentration at the radially outer side end portion 12e of the organic fiber reinforced layer 12. This leads to an insufficient effect of suppressing separation of the organic fiber reinforced layer 12 originating from the radially outer side end portion 12e.

In the pneumatic tire described above, the 100% modulus $Kc_{M100}$ of the crack suppression layer 16 may be from 4.5 MPa to 10.0 MPa. Accordingly, the rubber flow during vulcanization is effectively suppressed, allowing suppression of cracking of a bead portion surface during the initial traveling stage. When the 100% modulus $Kc_{M100}$ of the crack suppression layer 16 is less than 4.5 MPa, the effect of reinforcing and supporting the sidewall rubber layer 13 is insufficient, preventing effective suppression of the rubber flow in the sidewall rubber layer 13 and the crack suppression layer 16. Additionally, in a case where the 100% modulus $Kc_{M100}$ of the crack suppression layer 16 is more than 10.0 MPa, the crack suppression layer 16 is excessively rigid. This increases the strain at the radially outer side end portion 12e of the organic fiber reinforced layer 12 caused by displacement of the body portion of the carcass layer 4 during grounding, and separation originating from the end portion 12e may occur. In particular, the 100% modulus $Kc_{M100}$ of the crack suppression layer 16 is preferably 6.0 MPa to 9.0 MPa. Note that, in a case where the 100% modulus $Kc_{M100}$ of the crack suppression layer 16 is increased, the Mooney viscosity in the unvulcanized state tends to increase but the Mooney viscosity in the unvulcanized state defined by JIS-K6300-1 preferably ranges from 70 to 100 (ML(1+4) 100° C.).

In the pneumatic tire described above, the elongation at break $Kc_{EB}$ of the crack suppression layer 16 may be 300% or more. This allows effective suppression of separation of the organic fiber reinforced layer 12 originating from the radially outer side end portion 12e. When the elongation at break $Kc_{EB}$ of the crack suppression layer 16 is less than 300%, the effect of suppressing separation is reduced. The upper limit value of the elongation at break $Kc_{EB}$ of the crack suppression layer 16 may be 500%.

In the pneumatic tire described above, as illustrated in FIG. 3, the crack suppression layer 16 may have a thickness $T_{KC}$ of 2.0 mm to 6.0 mm in a region X from the radially outermost end portion 12e of the organic fiber reinforced layer 12 to the position where the crack suppression layer 16 contacts the body portion of the carcass layer 4. Accordingly, the rubber flow during vulcanization is effectively suppressed, allowing suppression of cracking of a bead portion surface during the initial traveling stage. Note that the thickness $T_{KC}$ of the crack suppression layer 16 is a thickness measured in a direction orthogonal to a center line passing through a center position of the crack suppression layer 16 in the thickness direction.

When the thickness $T_{KC}$ of the crack suppression layer 16 is less than 2.0 mm, the effect of reinforcing and supporting the sidewall rubber layer 13 is insufficient, preventing effective suppression of the rubber flow in the sidewall rubber layer 13 and the crack suppression layer 16. Additionally, when the thickness $T_{KC}$ of the crack suppression layer 16 is more than 6.0 mm, the crack suppression layer 16 is excessively rigid, and thus strain amplitude in the tire radial direction may increase at the end portion 12e of the organic fiber reinforced layer 12, causing separation originating from the end portion 12e. In particular, the thickness $T_{KC}$ of the crack suppression layer 16 preferably ranges from 2.5 mm to 5.0 mm.

Figure 4:
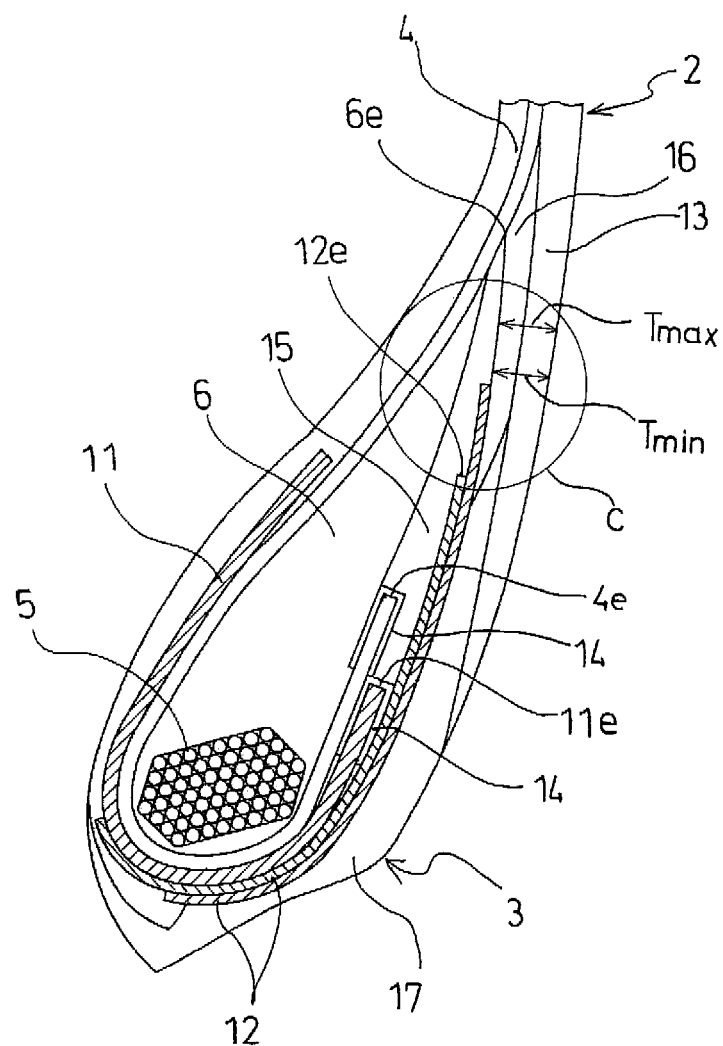
FIG. 4 is yet another cross-sectional view illustrating the bead portion of the pneumatic tire in FIG. 1.
Figure 5:
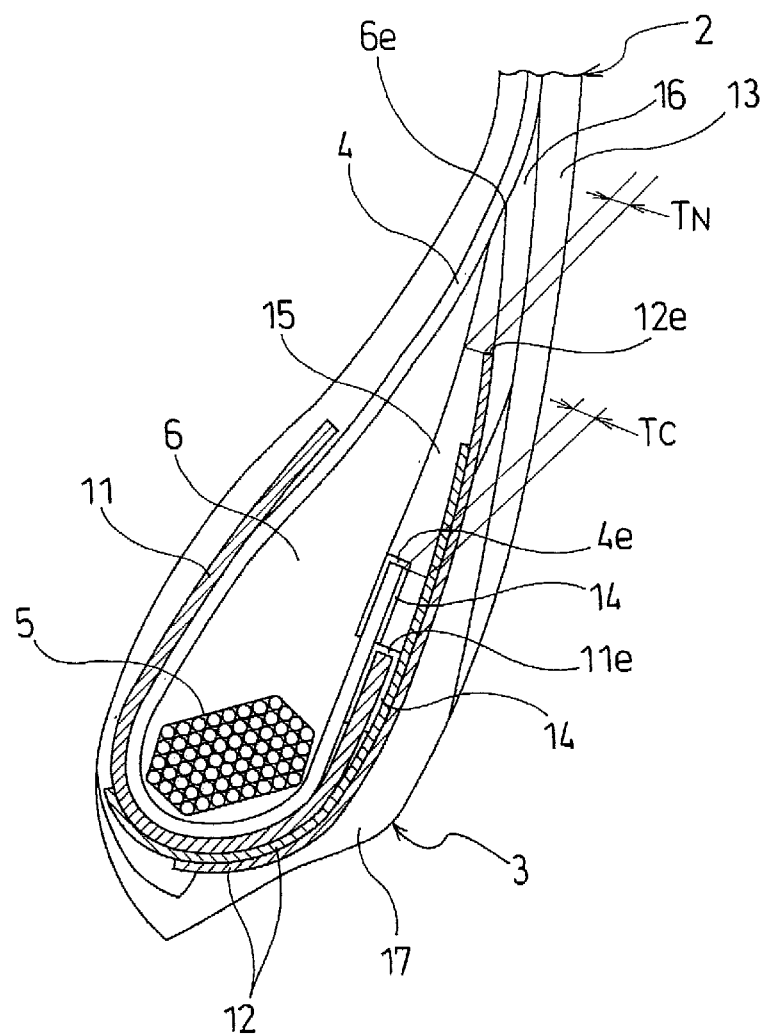
FIG. 5 is yet another cross-sectional view illustrating the bead portion of the pneumatic tire in FIG. 1.
Figure 6:
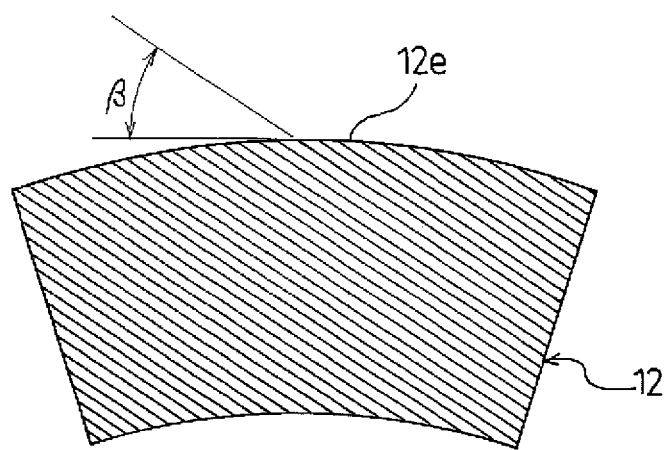
FIG. 6 is a side view illustrating an organic fiber reinforced layer embedded in the bead portion.

In a tire meridian cross-section in the pneumatic tire described above, in a region with a radius of 15 mm or less around the radially outermost end portion 12e of the organic fiber reinforced layer 12, i.e., in a circle C, the maximum value $T_{max}$ and the minimum value $T_{min}$ of the total thickness of the crack suppression layer 16 and the sidewall rubber layer 13 may satisfy the relationship $1.00 \leq T_{max}/T_{min} \leq 1.25$, as illustrated in FIG. 4. Accordingly, a rubber gauge exhibits no local fluctuation at or near the radially outermost end portion 12e of the organic fiber reinforced layer 12, and thus rubber is less likely to be trapped during vulcanization, allowing suppression of cracking of the bead portion surface during the initial traveling stage.

In a case where $T_{max}/T_{min}$ is more than 1.25, rubber is less likely to be trapped during vulcanization, and the bead portion surface may crack during the initial traveling stage. In particular, preferably, $1.00 \leq T_{max}/T_{min} \leq 1.20$.

In the pneumatic tire described above, the inner rubber reinforcing layer 15 may contact the body portion of the carcass layer 4 at a position on the radially outer side with respect to the radially outer side end portion 6e of the bead filler 6, the 100% modulus $Ki_{M100}$ of the inner rubber reinforcing layer 15 may be 4.5 MPa to 10.0 MPa, and the elongation at break $Ki_{EB}$ of the inner rubber reinforcing layer 15 may be 300% or more. By thus extending the inner rubber reinforcing layer 15 to the body portion of the carcass layer 4 and specifying the 100% modulus $Ki_{M100}$ and the elongation at break $Ki_{EB}$ of the inner rubber reinforcing layer 15, the stress concentration at the radially outer side end portion 12e of the organic fiber reinforced layer 12 is mitigated, allowing effective suppression of separation of the organic fiber reinforced layer 12 originating from the radially outer side end portion 12e.

When the 100% modulus $Ki_{M100}$ of the inner rubber reinforcing layer 15 is less than 4.5 MPa, the effect of reinforcing and supporting the sidewall rubber layer 13 is insufficient, preventing effective suppression of the rubber flow in the sidewall rubber layer 13 and the crack suppression layer 16. Additionally, when the 100% modulus $Ki_{M100}$ of the inner rubber reinforcing layer 15 is more than 10.0 MPa, the inner rubber reinforcing layer 15 is excessively rigid. Thus, displacement of the body portion of the carcass layer 4 at the time of contact with the ground may increase strain at the radially outer side end portion 12e of the organic fiber reinforced layer 12, causing separation originating from the end portion 12e. In particular, the 100% modulus $Ki_{M100}$ of the inner rubber reinforcing layer 15 preferably ranges from 6.0 MPa to 9.0 MPa. On the other hand, when the elongation at break $Ki_{EB}$ of the inner rubber reinforcing layer 15 is less than 300%, the effect of suppressing separation is reduced. The upper limit value of the elongation at break $Ki_{EB}$ of the inner rubber reinforcing layer 15 may be 500%.

In the pneumatic tire described above, as illustrated in FIG. 5, the inner rubber reinforcing layer 15 has a thickness Tc of 2.0 mm or more at the turned up end portion 4e of the carcass layer 4, and the inner rubber reinforcing layer 15 has a thickness $T_N$ of 1.5 mm or more at the radially outermost end portion 12e of the organic fiber reinforced layer 12. This mitigates the stress concentration at the turned up end portion 4e of the carcass layer 4 and at the radially outermost end portion 12e of the organic fiber reinforced layer 12, allowing effective suppression of separation originating from these end portions 4e and 12e. Note that the thickness Tc of the inner rubber reinforcing layer 15 is a thickness including the thickness of the edge tape 14.

When the thickness Tc of the inner rubber reinforcing layer 15 is less than 2.0 mm, the effect of suppressing separation is reduced. Additionally, when the thickness $T_N$ of the inner rubber reinforcing layer 15 is less than 1.5 mm, the effect of suppressing separation is reduced.

In the pneumatic tire described above, the organic fiber reinforced layer 12 may have a cord inclination angle β of from 15° to 45° with respect to the tire circumferential direction at the radially outer side end portion 12e. This prevents an excessive increase in tension acting on the organic fiber reinforced layer 12, thus allowing effective suppression of separation of the organic fiber reinforced layer 12 originating from the radially outer side end portion 12e. Note that the cord inclination angle β is an inclination angle with respect to the tire circumferential direction of the organic fiber cords constituting the organic fiber reinforced layer 12, and is measured in a range of within 8 mm from the radially outer side edge of the organic fiber reinforced layer 12.

When the cord inclination angle β of the organic fiber reinforced layer 12 is less than 15°, it is difficult to turn up the organic fiber reinforced layer 12 together with the sidewall rubber layer 13 in the tire molding process. Additionally, when the cord inclination angle β of the organic fiber reinforced layer 12 is more than 45°, the tension acting on the organic fiber reinforced layer 12 is excessively large, increasing the strain at the radially outer side end portion 12e of the organic fiber reinforced layer 12. Thus, the effect of suppressing separation of the organic fiber reinforced layer 12 from the radially outer side end portion 12e is reduced. In particular, the cord inclination angle β of the organic fiber reinforced layer 12 preferably ranges from 20° to 35°.

Additionally, the organic fiber reinforced layer 12 may have a tensile rigidity $A_N$ of from 15 kN/50 mm to 50 kN/50 mm. This allows effective suppression of separation of the carcass layer 4 originating from the turned up end portion 4e based on the reinforcing effect of the organic fiber reinforced layer 12. The tensile rigidity $A_N$ is determined by the following Formula (1).

$$A_N \text{ (kN/50 mm)} = Ac_N \text{ (kN/cord)} \times N_N \text{ (number of cords/50 mm)} \quad (1)$$

In Formula (1) above, $Ac_N$ is the tensile rigidity (kN/cord) of the organic fiber cords constituting the organic fiber reinforced layer 12, and $N_N$ is the cord count (number of cords/50 mm) of the organic fiber reinforced layer. The tensile rigidity $Ac_N$ of the organic fiber cords is a value obtained by conversion using an applied load (N), used when intermediate elongation is measured in accordance with JIS-L1017, and strain obtained by dividing, by 100, the intermediate elongation (%) measured. For example, in a case where the intermediate elongation is 9.0% when the applied load is 67 N, then $Ac_N$=67(N)/0.09/1000=0.744 (kN/cord) is obtained.

When the tensile rigidity $A_N$ of the organic fiber reinforced layer 12 is less than 15 kN/50 mm, the effect of suppressing circumferential shear strain at the turned up end portion 4e of the carcass layer 4 is insufficient, and thus separation of the carcass layer 4 may originate from the turned up end portion 4e. In addition, when the tensile rigidity $A_N$ of the organic fiber reinforced layer 12 is more than 50 kN/50 mm, a difference in rigidity between the end portion 12e of the organic fiber reinforced layer 12 and the rubber increases, and the stress concentration is significant. Thus, separation of the organic fiber reinforced layer 12 may originate from the end portion 12e. In particular, the tensile rigidity $A_N$ of the organic fiber reinforced layer 12 is preferably from 20 kN/50 mm to 45 kN/50 mm.

The cord count $N_N$ of the organic fiber reinforced layer 12 may be from 25 cords/50 mm to 45 cords/50 mm. This allows effective suppression of separation of the organic fiber reinforced layer 12 from the end portion 12e. Note that the cord count $N_N$ is a cord count per a 50 mm width measured along a direction orthogonal to the longitudinal direction of the organic fiber cords constituting the organic fiber reinforced layer 12, and is measured in a range of within 8 mm from the radially outer side edge of the organic fiber reinforced layer 12.

When the cord count $N_N$ of the organic fiber reinforced layer 12 is less than 25 cords/50 mm, the tension acting on each organic fiber cord constituting the organic fiber reinforced layer 12 is excessively large, and thus separation of the organic fiber reinforced layer 12 may originate from the end portion 12e. In addition, when the cord count $N_N$ of the organic fiber reinforced layer 12 is more than 45 cords/50 mm, the intervals between the organic fiber cords constituting the organic fiber reinforced layer 12 are excessively small, increasing the strain between the cords at the end portion 12e. Thus, separation of the organic fiber reinforced layer 12 may originate from the end portion 12e. In particular, the cord count $N_N$ of the organic fiber reinforced layer 12 is preferably 30 cords/50 mm to 40 cords/50 mm.

Figure 7:
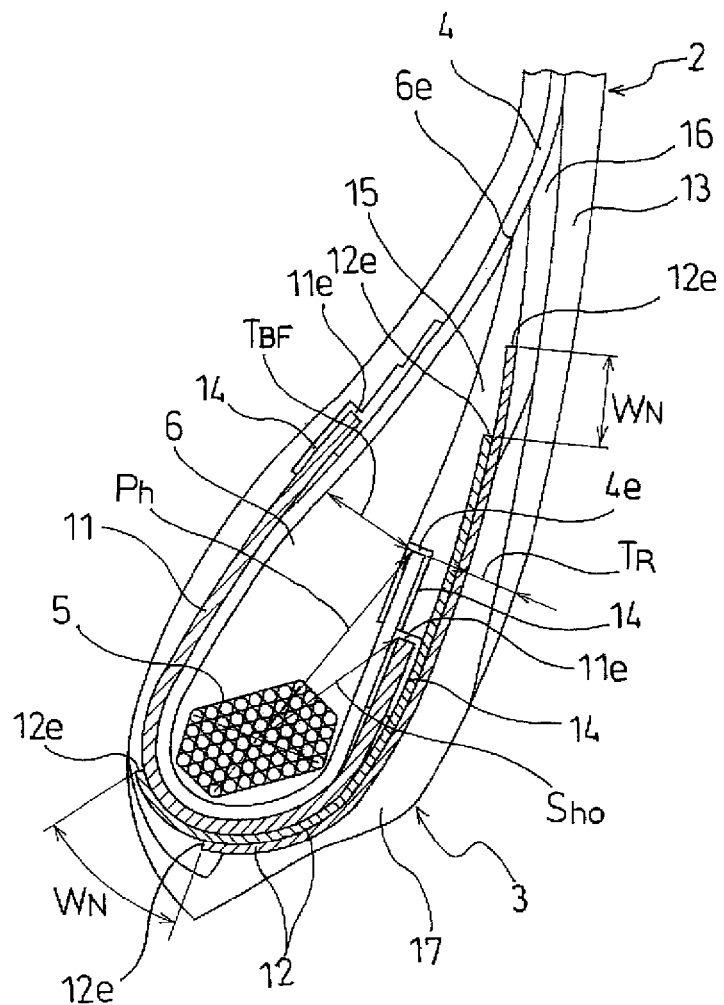
FIG. 7 is a cross-sectional view illustrating the bead portion of the pneumatic tire in FIG. 1.

In a case where the pneumatic tire described above includes at least two organic fiber reinforced layers 12 including organic fiber cords intersecting with one another as illustrated in FIG. 7, a step width $W_N$ between the end portions of the at least two organic fiber reinforced layers 12 may be 5 mm or more. This avoids the stress concentration at the end portion 12e of the organic fiber reinforced layer 12, allowing effective suppression of separation of the organic fiber reinforced layer 12 originating from the end portion 12e. The step width $W_N$ as described above is applied to each of the radially outer side end portion 12e and the radially inner side end portion 12e of the organic fiber reinforced layer 12.

When the step width $W_N$ between the end portions of the organic fiber reinforced layer 12 is less than 5 mm, the stress concentration at the end portion 12e of the organic fiber reinforced layer 12 may be significant, causing separation of the organic fiber reinforced layer 12 originating from the end portion 12e.

In the pneumatic tire described above, as illustrated in FIG. 7, a distance $P_h$ from the center of the bead core 5 to the turned up end portion 4e of the carcass layer 4 may be from 26.0 mm to 40.0 mm, and the shortest distance $T_{BF}$ from the turned up end portion 4e of the carcass layer 4 to the body portion of the carcass layer 4 may be 11.0 mm or more. The shortest distance $T_R$ from the organic fiber reinforced layer 12 to the outer surface of the bead portion 3 at the position of the turned up end portion 4e of the carcass layer 4 may be from 6.0 mm to 12.0 mm. This allows effective suppression of separation of the carcass layer 4 originating from the turned up end portion 4e. Note that the center of the bead core 5 is the intersection point between diagonal lines of a virtual quadrangle formed by joining center points of the four wires of the wires constituting the bead core 5 in a case where the wires are selected to maximize the area of the virtual rectangle. Additionally, the shortest distance $T_R$ is a distance from the organic fiber reinforced layer 12 to the outer surface of the bead portion 3 measured on a straight line that joins the turned up end portion 4e of the carcass layer 4 to the outer surface of the bead portion 3 in the shortest distance.

When the distance $P_h$ from the center of the bead core 5 to the turned up end portion 4e of the carcass layer 4 is less than 26.0 mm, the carcass layer 4 may get pulled out. In contrast, when the distance $P_h$ is more than 40.0 mm, the turned up end portion 4e of the carcass layer 4 is disposed in a region of the bead portion 3 where significant deformation occurs, and thus separation of the carcass layer 4 may originate from the turned up end portion 4e. In particular, the distance $P_h$ from the center of the bead core 5 to the turned up end portion 4e of the carcass layer 4 is preferably 28.0 mm to 38.0 mm.

Additionally, when the shortest distance $T_{BF}$ from the turned up end portion 4e of the carcass layer 4 to the body portion of the carcass layer 4 is less than 11.0 mm, or the shortest distance $T_R$ from the organic fiber reinforced layer 12 to the outer surface of the bead portion 3 at the position of the turned up end portion 4e of the carcass layer 4 is less than 6.0 mm, an insufficient rubber volume may increase the strain amplitude at the turned up end portion 4e of the carcass layer 4 in the tire radial direction, causing separation of the carcass layer 4 originating from the turned up end portion 4e. The upper limit value of the shortest distance $T_{BF}$ may be 18.0 mm. On the other hand, when the shortest distance $T_R$ from the organic fiber reinforced layer 12 to the outer surface of the bead portion 3 at the position of the turned up end portion 4e of the carcass layer 4 is more than 12.0 mm, the carcass line of the body portion of the carcass layer 4 protrudes toward the tire inner side, and thus makes a significant change in shape between before and after inflation. As a result, separation of the carcass layer 4 may originate from the turned up end portion 4e.

In the pneumatic tire described above, as illustrated in FIG. 7, the distance $P_h$ from the center of the bead core 5 to the turned up end portion 4e of the carcass layer 4 and a distance $S_{ho}$ from the center of the bead core 5 to the end portion 11e of the steel reinforced layer 11 may satisfy a relationship 5.0 mm≤$P_h$–$S_{ho}$. This mitigates the stress concentration at the turned up end portion 4e of the carcass layer 4 and at the end portion 11e of the steel reinforced layer 11, allowing effective suppression of separation originating from the end portions 4e and 11e. When the value of $P_h$–$S_{ho}$ is less than 5 mm, the strain at the turned up end portion 4e of the carcass layer 4 increases, and separation of the carcass layer 4 may originate from the turned up end portion 4e.

In the embodiment of FIG. 7, the tire width direction inner end portion 11e of the steel reinforced layer 11 is also covered with the edge tape 14. The edge tape 14 as described above can be added in a discretionary manner.

Figure 8:
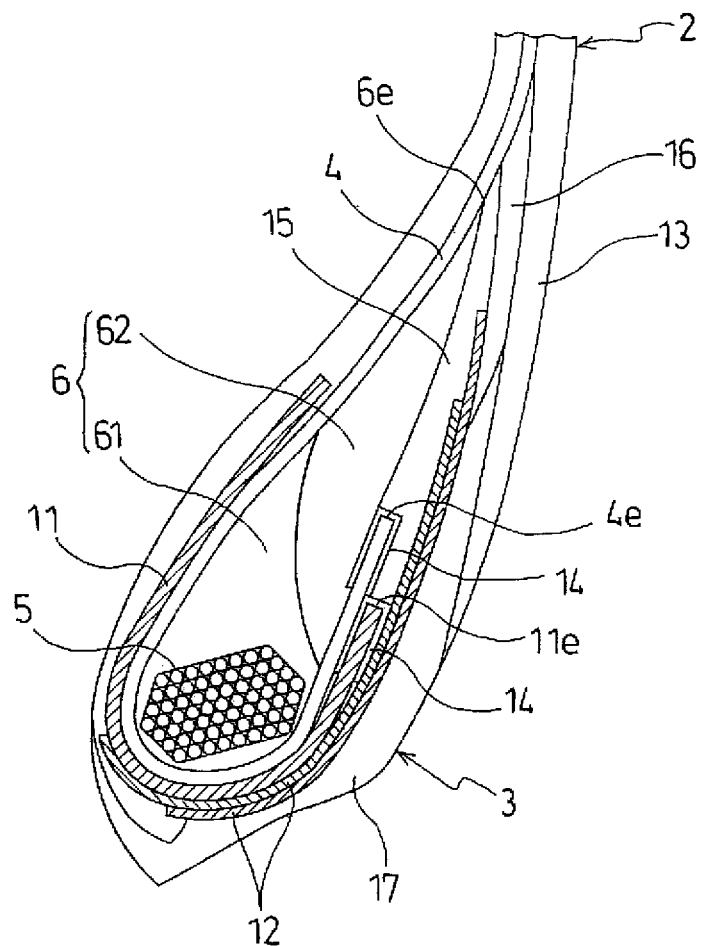
FIG. 8 is a cross-sectional view illustrating a modified example of the bead portion.

FIG. 8 illustrates a modified example of the bead portion. In FIG. 8, the bead filler 6 includes a hard filler layer 61 located on the radially inner side and a soft filler layer 62 located on the radially outer side, and the hard filler layer 61 has a 100% modulus $B1_{M100}$ set within a range from 6.0 MPa to 18.0 MPa, and the soft filler layer 62 has a 100% modulus $B2_{M100}$ set within a range from 1.0 MPa to 6.0 MPa. More specifically, the turned up end portion 4e of the carcass layer 4 terminates at a position adjacent to the soft filler layer 62. This allows effective suppression of separation of the carcass layer 4 originating from the turned up end portion 4e.

When the 100% modulus $B1_{M100}$ of the hard filler layer 61 is less than 6.0 MPa, the bead portion 3 is excessively flexed when a load is applied, and thus separation of the carcass layer 4 may originate from the turned up end portion 4e. Additionally, when the 100% modulus $B1_{M100}$ of the hard filler layer 61 is more than 18.0 MPa, separation may occur between the body portion of the carcass layer 4 and the hard filler layer 61. In particular, the 100% modulus $B1_{M100}$ of the hard filler layer 61 preferably ranges from 8.0 MPa to 16.0 MPa.

On the other hand, when the 100% modulus $B2_{M100}$ of the soft filler layer 62 is less than 1.0 MPa, the bead portion 3 is excessively flexed when a load is applied, and thus separation of the carcass layer 4 may originate from the turned up end portion 4e. Additionally, when the 100% modulus $B2_{M100}$ of the soft filler layer 62 is more than 6.0 MPa, the strain at the turned up end portion 4e of the carcass layer 4 increases, and thus separation of the carcass layer 4 may originate from the turned up end portion 4e. In particular, the 100% modulus $B2_{M100}$ of the soft filler layer 62 preferably ranges from 2.0 MPa to 5.0 MPa.

The pneumatic tire according to the embodiment described above may have a load index of 121 or more on a single wheel or a ply rating of 10 PR or more. In pneumatic tires having such a load index or ply rating, improving the durability of the bead portions is extremely meaningful.

EXAMPLES

Pneumatic tires according to Conventional Example, Comparative Examples 1 and 2, and Examples 1 to 23 were manufactured. The tires had a tire size of 275/70R22.5, included a tread portion, a pair of sidewall portions, and a pair of bead portions, and included a carcass layer mounted between the pair of bead portions and including a plurality of steel cords, the carcass layer being turned up around a bead core of each of the bead portions from a tire inner side to a tire outer side, the tires differing from one another only in the structure of the bead portions.

For the tires of the Conventional Example, Comparative Examples 1 and 2, and Examples 1 to 23, the following were set as indicated in Tables 1 to 3: the presence of contact of a crack suppression layer with a body portion of the carcass layer, the amount of overlap L between the crack suppression layer and an organic fiber reinforced layer, the ratio $Kc_{M100}/S_{M100}$ of the 100% modulus $Kc_{M100}$ of the crack suppression layer to the 100% modulus $S_{M100}$ of a sidewall rubber layer, the 100% modulus $Kc_{M100}$ of the crack suppression layer, the elongation at break $Kc_{EB}$ of the crack suppression layer, the thickness $T_{KC}$ of the crack suppression layer, the maximum value $T_{max}$ and the minimum value $T_{min}$ of the total thickness of the crack suppression layer and the sidewall rubber layer, $T_{max}/T_{min}$, the presence of contact of an inner rubber reinforcing layer with the body portion of the carcass layer, the 100% modulus $Ki_{M100}$ of the inner rubber reinforcing layer, the elongation at break $Ki_{EB}$ of the inner rubber reinforcing layer, the thickness Tc of the inner rubber reinforcing layer, the thickness $T_N$ of the inner rubber reinforcing layer, the cord inclination angle β of the organic fiber reinforced layer, the tensile rigidity $A_N$ of the organic fiber reinforced layer, the cord count $N_N$ of the organic fiber reinforced layer, the step width $W_N$ of the organic fiber reinforced layer, the distance $P_h$ from the center of the bead core to a turned up end portion of the carcass layer, the shortest distance $T_{BF}$ from the turned up end portion of the carcass layer to the body portion of the carcass layer, the shortest distance $T_R$ from the organic fiber reinforced layer to the outer surface of the bead portion at the position of the turned up end portion of the carcass layer, the distance $S_{ho}$ from the center of the bead core to the end portion of the steel reinforced layer, $P_h-S_{ho}$, the 100% modulus $B1_{M100}$ of a hard filler layer, and the 100% modulus $B2_{M100}$ of a soft filler layer.

For these test tires, the durability of the bead portions was evaluated using a test method described below, and the results are indicated in Tables 1 to 3.

Durability of Bead Portions:

Each of the test tires was mounted on a rim specified by JATMA, inflated to 75% of the air pressure specified by JATMA, and subjected to a load 1.4 times as heavy as the load specified by JATMA, and running tests were performed on a drum testing machine at a running speed of 49 km/h. After 40,000 km of running, the circumferential lengths of cracks formed on the surfaces of both bead portions were measured. In addition, each test tire was cut at eight locations at equal intervals in the tire circumferential direction along the tire meridian, and the cross-sectional direction lengths of cracks originating from the turned up end portion of the carcass layer were measured in cut surfaces at the eight locations of both bead portions (a total of 16 locations). Furthermore, the sum of the circumferential length of the cracks in the bead portion surface and the cross-sectional direction lengths of the cracks in the bead portion cross section was determined. The evaluation results were expressed, using the reciprocal of the measurement values, as index values with the value of the Conventional Example being defined as 100. Larger index values indicate superior durability of the bead portion.

TABLE 1-1

|  | Conventional Example | Example 1 | Comparative Example 1 |
|---|---|---|---|
| Presence of contact of crack suppression layer with body portion of carcass layer | No | Yes | No |
| Amount of overlap L between crack suppression layer and organic fiber reinforced layer (mm) | — | 8.0 | 8.0 |
| $Kc_{M100}/S_{M100}$ | — | 3.8 | 3.8 |
| Modulus $Kc_{M100}$ (MPa) of crack suppression layer | — | 8.0 | 8.0 |
| Elongation at break $Kc_{EB}$ (%) of crack suppression layer | — | 370 | 370 |
| Thickness $T_{KC}$ (mm) of crack suppression layer | — | 3.5 | 3.5 |
| Maximum value $T_{max}$ (mm) of thickness | — | 9.0 | 9.0 |
| Minimum value $T_{min}$ (mm) of thickness | — | 8.3 | 8.3 |
| $T_{max}/T_{min}$ | — | 1.08 | 1.08 |
| Presence of contact of inner rubber reinforcing layer with body portion of carcass layer | — | Yes | Yes |
| Modulus $Ki_{M100}$ (MPa) of inner rubber reinforcing layer | — | 8.0 | 8.0 |
| Elongation at break $Ki_{EB}$ (%) of inner rubber reinforcing layer | — | 370 | 370 |
| Thickness Tc (mm) of inner rubber reinforcing layer | — | 3.0 | 3.0 |
| Thickness $T_N$ (mm) of inner rubber reinforcing layer | — | 2.0 | 2.0 |
| Cord inclination angle β (°) of organic fiber reinforced layer | 50 | 30 | 30 |
| Tensile rigidity $A_N$ (kN/50 mm) of organic fiber reinforced layer | 26 | 26 | 26 |
| Cord count $N_N$ (number of cords/50 mm) of organic fiber reinforced layer | 35 | 35 | 35 |
| Step width $W_N$ (mm) of organic fiber reinforced layer | 10 | 10 | 10 |
| Distance $P_h$ (mm) | 33.0 | 33.0 | 33.0 |
| Shortest distance $T_{BF}$ (mm) | 14.0 | 14.0 | 14.0 |
| Shortest distance $T_R$ (mm) | 7.6 | 7.6 | 8.5 |
| Distance $S_{ho}$ (mm) | 23.0 | 23.0 | 23.0 |
| $P_h - S_{ho}$ (mm) | 10.0 | 10.0 | 10.0 |
| Modulus $B1_{M100}$ (MPa) of hard filler layer | 12.6 | 12.6 | 12.6 |
| Modulus $B2_{M100}$ (MPa) of soft filler layer | 2.8 | 2.8 | 2.8 |
| Durability (index) of bead portions | 100 | 180 | 120 |

TABLE 1-2

|  | Comparative Example 2 | Example 2 | Example 3 |
|---|---|---|---|
| Presence of contact of crack suppression layer with body portion of carcass layer | Yes | Yes | Yes |
| Amount of overlap L between crack suppression layer and organic fiber reinforced layer (mm) | 2.0 | 8.0 | 8.0 |
| $Kc_{M100}/S_{M100}$ | 1.3 | 2.0 | 5.0 |
| Modulus $Kc_{M100}$ (MPa) of crack suppression layer | 2.8 | 4.2 | 10.5 |
| Elongation at break $Kc_{EB}$ (%) of crack suppression layer | 450 | 400 | 305 |
| Thickness $T_{KC}$ (mm) of crack suppression layer | 3.5 | 3.5 | 3.5 |
| Maximum value $T_{max}$ (mm) of thickness | 10.5 | 9.5 | 8.6 |

TABLE 1-2-continued

|  | Comparative Example 2 | Example 2 | Example 3 |
|---|---|---|---|
| Minimum value $T_{min}$ (mm) of thickness | 8.3 | 8.3 | 8.3 |
| $T_{max}/T_{min}$ | 1.27 | 1.14 | 1.04 |
| Presence of contact of inner rubber reinforcing layer with body portion of carcass layer | Yes | Yes | Yes |
| Modulus $Ki_{M100}$ (MPa) of inner rubber reinforcing layer | 8.0 | 8.0 | 8.0 |
| Elongation at break $Ki_{EB}$ (%) of inner rubber reinforcing layer | 370 | 370 | 370 |
| Thickness Tc (mm) of inner rubber reinforcing layer | 3.0 | 3.0 | 3.0 |
| Thickness $T_N$ (mm) of inner rubber reinforcing layer | 2.0 | 2.0 | 2.0 |
| Cord inclination angle β (°) of organic fiber reinforced layer | 40 | 30 | 30 |
| Tensile rigidity $A_N$ (kN/50 mm) of organic fiber reinforced layer | 26 | 26 | 26 |
| Cord count $N_N$ (number of cords/50 mm) of organic fiber reinforced layer | 35 | 35 | 35 |
| Step width $W_N$ (mm) of organic fiber reinforced layer | 10 | 10 | 10 |
| Distance $P_h$ (mm) | 33.0 | 33.0 | 33.0 |
| Shortest distance $T_{BF}$ (mm) | 14.0 | 14.0 | 14.0 |
| Shortest distance $T_R$ (mm) | 8.5 | 8.5 | 8.5 |
| Distance $S_{ho}$ (mm) | 23.0 | 23.0 | 23.0 |
| $P_h - S_{ho}$ (mm) | 10.0 | 10.0 | 10.0 |
| Modulus $B1_{M100}$ (MPa) of hard filler layer | 12.6 | 12.6 | 12.6 |
| Modulus $B2_{M100}$ (MPa) of soft filler layer | 2.8 | 2.8 | 2.8 |
| Durability (index) of bead portions | 100 | 135 | 175 |

TABLE 1-3

|  | Example 4 | Example 5 | Example 6 |
|---|---|---|---|
| Presence of contact of crack suppression layer with body portion of carcass layer | Yes | Yes | Yes |
| Amount of overlap L between crack suppression layer and organic fiber reinforced layer (mm) | 8.0 | 8.0 | 8.0 |
| $Kc_{M100}/S_{M100}$ | 3.8 | 3.8 | 1.8 |
| Modulus $Kc_{M100}$ (MPa) of crack suppression layer | 8.0 | 8.0 | 3.8 |
| Elongation at break $Kc_{EB}$ (%) of crack suppression layer | 200 | 370 | 405 |
| Thickness $T_{KC}$ (mm) of crack suppression layer | 3.5 | 1.5 | 3.5 |
| Maximum value $T_{max}$ (mm) of thickness | 9.0 | 9.0 | 10.5 |
| Minimum value $T_{min}$ (mm) of thickness | 8.3 | 8.3 | 8.3 |
| $T_{max}/T_{min}$ | 1.08 | 1.08 | 1.27 |
| Presence of contact of inner rubber reinforcing layer with body portion of carcass layer | Yes | Yes | Yes |
| Modulus $Ki_{M100}$ (MPa) of inner rubber reinforcing layer | 8.0 | 8.0 | 8.0 |
| Elongation at break $Ki_{EB}$ (%) of inner rubber reinforcing layer | 370 | 370 | 370 |
| Thickness Tc (mm) of inner rubber reinforcing layer | 3.0 | 3.0 | 3.0 |
| Thickness $T_N$ (mm) of inner rubber reinforcing layer | 2.0 | 2.0 | 2.0 |
| Cord inclination angle β (°) of organic fiber reinforced layer | 30 | 30 | 30 |
| Tensile rigidity $A_N$ (kN/50 mm) of organic fiber reinforced layer | 26 | 26 | 26 |
| Cord count $N_N$ (number of cords/50 mm) of organic fiber reinforced layer | 35 | 35 | 35 |
| Step width $W_N$ (mm) of organic fiber reinforced layer | 10 | 10 | 10 |
| Distance $P_h$ (mm) | 33.0 | 33.0 | 33.0 |
| Shortest distance $T_{BF}$ (mm) | 14.0 | 14.0 | 14.0 |
| Shortest distance $T_R$ (mm) | 8.5 | 8.5 | 8.5 |
| Distance $S_{ho}$ (mm) | 23.0 | 23.0 | 23.0 |
| $P_h - S_{ho}$ (mm) | 10.0 | 10.0 | 10.0 |
| Modulus $B1_{M100}$ (MPa) of hard filler layer | 12.6 | 12.6 | 12.6 |
| Modulus $B2_{M100}$ (MPa) of soft filler layer | 2.8 | 2.8 | 2.8 |
| Durability (index) of bead portions | 148 | 140 | 130 |

TABLE 2-1

|  | Example 7 | Example 8 | Example 9 |
|---|---|---|---|
| Presence of contact of crack suppression layer with body portion of carcass layer | Yes | Yes | Yes |
| Amount of overlap L between crack suppression layer and organic fiber reinforced layer (mm) | 8.0 | 8.0 | 8.0 |
| $Kc_{M100}/S_{M100}$ | 3.8 | 3.8 | 3.8 |
| Modulus $Kc_{M100}$ (MPa) of crack suppression layer | 8.0 | 8.0 | 8.0 |
| Elongation at break $Kc_{EB}$ (%) of crack suppression layer | 370 | 370 | 370 |
| Thickness $T_{KC}$ (mm) of crack suppression layer | 3.5 | 3.5 | 3.5 |
| Maximum value $T_{max}$ (mm) of thickness | 9.0 | 9.0 | 9.0 |
| Minimum value $T_{min}$ (mm) of thickness | 8.3 | 8.3 | 8.3 |
| $T_{max}/T_{min}$ | 1.08 | 1.08 | 1.08 |
| Presence of contact of inner rubber reinforcing layer with body portion of carcass layer | No | No | Yes |
| Modulus $Ki_{M100}$ (MPa) of inner rubber reinforcing layer | — | 8.0 | 4.2 |
| Elongation at break $Ki_{EB}$ (%) of inner rubber reinforcing layer | — | 370 | 400 |
| Thickness Tc (mm) of inner rubber reinforcing layer | — | 3.0 | 3.0 |
| Thickness $T_N$ (mm) of inner rubber reinforcing layer | — | 2.0 | 2.0 |
| Cord inclination angle β (°) of organic fiber reinforced layer | 30 | 30 | 30 |
| Tensile rigidity $A_N$ (kN/50 mm) of organic fiber reinforced layer | 26 | 26 | 26 |
| Cord count $N_N$ (number of cords/50 mm) of organic fiber reinforced layer | 35 | 35 | 35 |
| Step width $W_N$ (mm) of organic fiber reinforced layer | 10 | 10 | 10 |
| Distance $P_h$ (mm) | 33.0 | 33.0 | 33.0 |
| Shortest distance $T_{BF}$ (mm) | 14.0 | 14.0 | 14.0 |
| Shortest distance $T_R$ (mm) | 8.5 | 8.5 | 8.5 |
| Distance $S_{ho}$ (mm) | 23.0 | 23.0 | 23.0 |
| $P_h - S_{ho}$ (mm) | 10.0 | 10.0 | 10.0 |
| Modulus $B1_{M100}$ (MPa) of hard filler layer | 12.6 | 12.6 | 12.6 |
| Modulus $B2_{M100}$ (MPa) of soft filler layer | 2.8 | 2.8 | 2.8 |
| Durability (index) of bead portions | 144 | 172 | 164 |

TABLE 2-2

|  | Example 10 | Example 11 | Example 12 |
|---|---|---|---|
| Presence of contact of crack suppression layer with body portion of carcass layer | Yes | Yes | Yes |
| Amount of overlap L between crack suppression layer and organic fiber reinforced layer (mm) | 8.0 | 8.0 | 8.0 |
| $Kc_{M100}/S_{M100}$ | 3.8 | 3.8 | 3.8 |
| Modulus $Kc_{M100}$ (MPa) of crack suppression layer | 8.0 | 8.0 | 8.0 |
| Elongation at break $Kc_{EB}$ (%) of crack suppression layer | 370 | 370 | 370 |
| Thickness $T_{KC}$ (mm) of crack suppression layer | 3.5 | 3.5 | 3.5 |
| Maximum value $T_{max}$ (mm) of thickness | 9.0 | 9.0 | 9.0 |
| Minimum value $T_{min}$ (mm) of thickness | 8.3 | 8.3 | 8.3 |
| $T_{max}/T_{min}$ | 1.08 | 1.08 | 1.08 |
| Presence of contact of inner rubber reinforcing layer with body portion of carcass layer | Yes | Yes | Yes |
| Modulus $Ki_{M100}$ (MPa) of inner rubber reinforcing layer | 11.0 | 8.0 | 8.0 |
| Elongation at break $Ki_{EB}$ (%) of inner rubber reinforcing layer | 290 | 370 | 370 |
| Thickness Tc (mm) of inner rubber reinforcing layer | 3.0 | 1.0 | 3.0 |
| Thickness $T_N$ (mm) of inner rubber reinforcing layer | 2.0 | 1.0 | 2.0 |
| Cord inclination angle β (°) of organic fiber reinforced layer | 30 | 30 | 50 |
| Tensile rigidity $A_N$ (kN/50 mm) of organic fiber reinforced layer | 26 | 26 | 26 |
| Cord count $N_N$ (number of cords/50 mm) of organic fiber reinforced layer | 35 | 35 | 35 |
| Step width $W_N$ (mm) of organic fiber reinforced layer | 10 | 10 | 10 |
| Distance $P_h$ (mm) | 33.0 | 33.0 | 33.0 |
| Shortest distance $T_{BF}$ (mm) | 14.0 | 14.0 | 14.0 |
| Shortest distance $T_R$ (mm) | 8.5 | 8.5 | 8.5 |
| Distance $S_{ho}$ (mm) | 23.0 | 23.0 | 23.0 |
| $P_h - S_{ho}$ (mm) | 10.0 | 10.0 | 10.0 |
| Modulus $B1_{M100}$ (MPa) of hard filler layer | 12.6 | 12.6 | 12.6 |
| Modulus $B2_{M100}$ (MPa) of soft filler layer | 2.8 | 2.8 | 2.8 |
| Durability (index) of bead portions | 154 | 153 | 162 |

TABLE 2-3

|  | Example 13 | Example 14 | Example 15 |
| --- | --- | --- | --- |
| Presence of contact of crack suppression layer with body portion of carcass layer | Yes | Yes | Yes |
| Amount of overlap L between crack suppression layer and organic fiber reinforced layer (mm) | 8.0 | 8.0 | 8.0 |
| $Kc_{M100}/S_{M100}$ | 3.8 | 3.8 | 3.8 |
| Modulus $Kc_{M100}$ (MPa) of crack suppression layer | 8.0 | 8.0 | 8.0 |
| Elongation at break $Kc_{EB}$ (%) of crack suppression layer | 370 | 370 | 370 |
| Thickness $T_{KC}$ (mm) of crack suppression layer | 3.5 | 3.5 | 3.5 |
| Maximum value $T_{max}$ (mm) of thickness | 9.0 | 9.0 | 9.0 |
| Minimum value $T_{min}$ (mm) of thickness | 8.3 | 8.3 | 8.3 |
| $T_{max}/T_{min}$ | 1.08 | 1.08 | 1.08 |
| Presence of contact of inner rubber reinforcing layer with body portion of carcass layer | Yes | Yes | Yes |
| Modulus $Ki_{M100}$ (MPa) of inner rubber reinforcing layer | 8.0 | 8.0 | 8.0 |
| Elongation at break $Ki_{EB}$ (%) of inner rubber reinforcing layer | 370 | 370 | 370 |
| Thickness Tc (mm) of inner rubber reinforcing layer | 3.0 | 3.0 | 3.0 |
| Thickness $T_N$ (mm) of inner rubber reinforcing layer | 2.0 | 2.0 | 2.0 |
| Cord inclination angle β (°) of organic fiber reinforced layer | 30 | 30 | 30 |
| Tensile rigidity $A_N$ (kN/50 mm) of organic fiber reinforced layer | 13 | 26 | 26 |
| Cord count $N_N$ (number of cords/50 mm) of organic fiber reinforced layer | 17 | 35 | 35 |
| Step width $W_N$ (mm) of organic fiber reinforced layer | 10 | 2 | 10 |
| Distance $P_h$ (mm) | 33.0 | 33.0 | 23.0 |
| Shortest distance $T_{BF}$ (mm) | 14.0 | 14.0 | 17.0 |
| Shortest distance $T_R$ (mm) | 8.5 | 8.5 | 8.5 |
| Distance $S_{ho}$ (mm) | 23.0 | 23.0 | 23.0 |
| $P_h - S_{ho}$ (mm) | 10.0 | 10.0 | 0.0 |
| Modulus $B1_{M100}$ (MPa) of hard filler layer | 12.6 | 12.6 | 12.6 |
| Modulus $B2_{M100}$ (MPa) of soft filler layer | 2.8 | 2.8 | 2.8 |
| Durability (index) of bead portions | 166 | 162 | 170 |

TABLE 3-1

|  | Example 16 | Example 17 | Example 18 |
| --- | --- | --- | --- |
| Presence of contact of crack suppression layer with body portion of carcass layer | Yes | Yes | Yes |
| Amount of overlap L between crack suppression layer and organic fiber reinforced layer (mm) | 8.0 | 8.0 | 8.0 |
| $Kc_{M100}/S_{M100}$ | 3.8 | 3.8 | 3.8 |
| Modulus $Kc_{M100}$ (MPa) of crack suppression layer | 8.0 | 8.0 | 8.0 |
| Elongation at break $Kc_{EB}$ (%) of crack suppression layer | 370 | 370 | 370 |
| Thickness $T_{KC}$ (mm) of crack suppression layer | 3.5 | 3.5 | 3.5 |
| Maximum value $T_{max}$ (mm) of thickness | 9.0 | 9.0 | 9.0 |
| Minimum value $T_{min}$ (mm) of thickness | 8.3 | 8.3 | 8.3 |
| $T_{max}/T_{min}$ | 1.08 | 1.08 | 1.08 |
| Presence of contact of inner rubber reinforcing layer with body portion of carcass layer | Yes | Yes | Yes |
| Modulus $Ki_{M100}$ (MPa) of inner rubber reinforcing layer | 8.0 | 8.0 | 8.0 |
| Elongation at break $Ki_{EB}$ (%) of inner rubber reinforcing layer | 370 | 370 | 370 |
| Thickness Tc (mm) of inner rubber reinforcing layer | 3.0 | 3.0 | 3.0 |
| Thickness $T_N$ (mm) of inner rubber reinforcing layer | 2.0 | 2.0 | 2.0 |
| Cord inclination angle β (°) of organic fiber reinforced layer | 30 | 30 | 30 |
| Tensile rigidity $A_N$ (kN/50 mm) of organic fiber reinforced layer | 26 | 26 | 26 |
| Cord count $N_N$ (number of cords/50 mm) of organic fiber reinforced layer | 35 | 35 | 35 |
| Step width $W_N$ (mm) of organic fiber reinforced layer | 10 | 10 | 10 |
| Distance $P_h$ (mm) | 42.0 | 33.0 | 33.0 |
| Shortest distance $T_{BF}$ (mm) | 10.0 | 14.0 | 14.0 |
| Shortest distance $T_R$ (mm) | 8.5 | 4.5 | 13.5 |
| Distance $S_{ho}$ (mm) | 23.0 | 23.0 | 23.0 |
| $P_h - S_{ho}$ (mm) | 19.0 | 10.0 | 10.0 |
| Modulus $B1_{M100}$ (MPa) of hard filler layer | 12.6 | 12.6 | 12.6 |
| Modulus $B2_{M100}$ (MPa) of soft filler layer | 2.8 | 2.8 | 2.8 |
| Durability (index) of bead portions | 160 | 171 | 169 |

TABLE 3-2

|  | Example 19 | Example 20 | Example 21 |
|---|---|---|---|
| Presence of contact of crack suppression layer with body portion of carcass layer | Yes | Yes | Yes |
| Amount of overlap L between crack suppression layer and organic fiber reinforced layer (mm) | 8.0 | 8.0 | 8.0 |
| $Kc_{M100}/S_{M100}$ | 3.8 | 3.8 | 3.8 |
| Modulus $Kc_{M100}$ (MPa) of crack suppression layer | 8.0 | 8.0 | 8.0 |
| Elongation at break $Kc_{EB}$ (%) of crack suppression layer | 370 | 370 | 370 |
| Thickness $T_{KC}$ (mm) of crack suppression layer | 3.5 | 3.5 | 3.5 |
| Maximum value $T_{max}$ (mm) of thickness | 9.0 | 9.0 | 9.0 |
| Minimum value $T_{min}$ (mm) of thickness | 8.3 | 8.3 | 8.3 |
| $T_{max}/T_{min}$ | 1.08 | 1.08 | 1.08 |
| Presence of contact of inner rubber reinforcing layer with body portion of carcass layer | Yes | Yes | Yes |
| Modulus $Ki_{M100}$ (MPa) of inner rubber reinforcing layer | 8.0 | 8.0 | 8.0 |
| Elongation at break $Ki_{EB}$ (%) of inner rubber reinforcing layer | 370 | 370 | 370 |
| Thickness Tc (mm) of inner rubber reinforcing layer | 3.0 | 3.0 | 3.0 |
| Thickness $T_N$ (mm) of inner rubber reinforcing layer | 2.0 | 2.0 | 2.0 |
| Cord inclination angle β (°) of organic fiber reinforced layer | 30 | 30 | 30 |
| Tensile rigidity $A_N$ (kN/50 mm) of organic fiber reinforced layer | 26 | 26 | 26 |
| Cord count $N_N$ (number of cords/50 mm) of organic fiber reinforced layer | 35 | 35 | 35 |
| Step width $W_N$ (mm) of organic fiber reinforced layer | 10 | 10 | 10 |
| Distance $P_h$ (mm) | 33.0 | 33.0 | 33.0 |
| Shortest distance $T_{BF}$ (mm) | 14.0 | 14.0 | 14.0 |
| Shortest distance $T_R$ (mm) | 8.5 | 8.5 | 8.5 |
| Distance $S_{ho}$ (mm) | 23.0 | 23.0 | 23.0 |
| $P_h - S_{ho}$ (mm) | 3.0 | 10.0 | 10.0 |
| Modulus $B1_{M100}$ (MPa) of hard filler layer | 12.6 | 4.0 | 20.0 |
| Modulus $B2_{M100}$ (MPa) of soft filler layer | 2.8 | 2.8 | 2.8 |
| Durability (index) of bead portions | 175 | 176 | 176 |

TABLE 3-3

|  | Example 22 | Example 23 |
|---|---|---|
| Presence of contact of crack suppression layer with body portion of carcass layer | Yes | Yes |
| Amount of overlap L between crack suppression layer and organic fiber reinforced layer (mm) | 8.0 | 8.0 |
| $Kc_{M100}/S_{M100}$ | 3.8 | 3.8 |
| Modulus $Kc_{M100}$ (MPa) of crack suppression layer | 8.0 | 8.0 |
| Elongation at break $Kc_{EB}$ (%) of crack suppression layer | 370 | 370 |
| Thickness $T_{KC}$ (mm) of crack suppression layer | 3.5 | 3.5 |
| Maximum value $T_{max}$ (mm) of thickness | 9.0 | 9.0 |
| Minimum value $T_{min}$ (mm) of thickness | 8.3 | 8.3 |
| $T_{max}/T_{min}$ | 1.08 | 1.08 |
| Presence of contact of inner rubber reinforcing layer with body portion of carcass layer | Yes | Yes |
| Modulus $Ki_{M100}$ (MPa) of inner rubber reinforcing layer | 8.0 | 8.0 |
| Elongation at break $Ki_{EB}$ (%) of inner rubber reinforcing layer | 370 | 370 |
| Thickness Tc (mm) of inner rubber reinforcing layer | 3.0 | 3.0 |
| Thickness $T_N$ (mm) of inner rubber reinforcing layer | 2.0 | 2.0 |
| Cord inclination angle β (°) of organic fiber reinforced layer | 30 | 30 |
| Tensile rigidity $A_N$ (kN/50 mm) of organic fiber reinforced layer | 26 | 26 |
| Cord count $N_N$ (number of cords/50 mm) of organic fiber reinforced layer | 35 | 35 |
| Step width $W_N$ (mm) of organic fiber reinforced layer | 10 | 10 |
| Distance $P_h$ (mm) | 33.0 | 33.0 |
| Shortest distance $T_{BF}$ (mm) | 14.0 | 14.0 |
| Shortest distance $T_R$ (mm) | 8.5 | 8.5 |
| Distance $S_{ho}$ (mm) | 23.0 | 23.0 |
| $P_h - S_{ho}$ (mm) | 10.0 | 10.0 |
| Modulus $B1_{M100}$ (MPa) of hard filler layer | 12.6 | 12.6 |
| Modulus $B2_{M100}$ (MPa) of soft filler layer | 0.8 | 8.0 |
| Durability (index) of bead portions | 178 | 178 |

As can be seen from Tables 1 to 3, the tires of Examples 1 to 23 have improved the durability of the bead portions compared to that of Conventional Example. On the other hand, the tires of Comparative Examples 1 and 2 are not sufficiently effective for improving the durability of the bead portions.

The invention claimed is:

1. A pneumatic tire, comprising:
a tread portion extending in a tire circumferential direction and having an annular shape;
a pair of sidewall portions respectively disposed on both sides of the tread portion;
a pair of bead portions each disposed on an inner side in a tire radial direction of the sidewall portions; and
a carcass layer mounted between the pair of bead portions and comprising a plurality of steel cords, the carcass layer being turned up around a bead core of each of the bead portions from a tire inner side to a tire outer side,
a bead filler being disposed on an outer circumference of the bead core of each of the bead portions, a turned up end portion of the carcass layer being disposed on a radially inner side with respect to a radially outer side end portion of the bead filler, the turned up end portion of the carcass layer being spaced apart from a body portion of the carcass layer, at least one organic fiber reinforced layer that comprises a plurality of organic fiber cords being disposed on an outer side in a width direction of the bead filler in each of the bead portions, and a sidewall rubber layer exposed on a tire outer surface being disposed from the sidewall portion to the bead portion, and
an inner rubber reinforcing layer being disposed between the bead filler and the organic fiber reinforced layer and adjacent to the turned up end portion of the carcass layer, a crack suppression layer being disposed between the organic fiber reinforced layer and the sidewall rubber layer, the crack suppression layer extending toward a radially outer side from a position where the crack suppression layer overlaps, by 5 mm or more, the organic fiber reinforced layer located on an outermost side in the tire width direction and contacting the body portion of the carcass layer at a position on a radially outer side with respect to the radially outer side end portion of the bead filler, and a 100% modulus KcM100 of the crack suppression layer being at least 1.5 times as large as a 100% modulus SM100 of the sidewall rubber layer, wherein
the inner rubber reinforcing layer contacts the body portion of the carcass layer at a position on the radially outer side with respect to the radially outer side end portion of the bead filler, the inner rubber reinforcing layer has a 100% modulus KiM100 of from 4.5 MPa to 10.0 MPa, and the inner rubber reinforcing layer has an elongation at break KiEB of 300% or more.

2. The pneumatic tire according to claim 1, wherein the 100% modulus KcM100 of the crack suppression layer ranges from 4.5 MPa to 10.0 MPa.

3. The pneumatic tire according to claim 1, wherein the crack suppression layer has an elongation at break KcEB of 300% or more.

4. The pneumatic tire according to claim 1, wherein the crack suppression layer has a thickness TKC of from 2.0 mm to 6.0 mm in a region from the radially outermost end portion of the organic fiber reinforced layer to a position where the crack suppression layer contacts the body portion of the carcass layer.

5. The pneumatic tire according to claim 1, wherein in a tire meridian cross-section, in a region with a radius of 15 mm or less around the radially outermost end portion of the organic fiber reinforced layer, a maximum value Tmax and a minimum value Tmin of a total thickness of the crack suppression layer and the sidewall rubber layer satisfy a relationship $1.00 \leq Tmax/Tmin \leq 1.25$.

6. The pneumatic tire according to claim 1, wherein the inner rubber reinforcing layer has a thickness Tc of 2.0 mm or more at the turned up end portion of the carcass layer, and the inner rubber reinforcing layer has a thickness TN of 1.5 mm or more at the radially outermost end portion of the organic fiber reinforced layer.

7. The pneumatic tire according to claim 1, wherein the organic fiber reinforced layer has a cord inclination angle $\beta$ of from 15° to 45° with respect to the tire circumferential direction at the radially outer side end portion.

8. The pneumatic tire according to claim 1, wherein the organic fiber reinforced layer has a tensile rigidity AN of from 15 kN/50 mm to 50 kN/50 mm.

9. The pneumatic tire according to claim 1, wherein the organic fiber reinforced layer has a cord count NN of from 25 cords/50 mm to 45 cords/50 mm.

10. The pneumatic tire according to claim 1, wherein the at least one organic fiber reinforced layer comprises at least two organic fiber reinforced layers in which the organic fiber cords intersect one another, and a step width WN between end portions of the at least two organic fiber reinforced layers is 5 mm or more.

11. The pneumatic tire according to claim 1, wherein a distance Ph from a center of the bead core to the turned up end portion of the carcass layer ranges from 26.0 mm to 40.0 mm, a shortest distance TBF from the turned up end portion of the carcass layer to the body portion of the carcass layer is 11.0 mm or more, and a shortest distance TR from the organic fiber reinforced layer to an outer surface of the bead portion at a position of the turned up end portion of the carcass layer ranges from 6.0 mm to 12.0 mm.

12. The pneumatic tire according to claim 1, wherein a steel reinforced layer comprising a plurality of steel cords is disposed in each of the bead portions in such a manner as to wrap around the carcass layer, the bead core, and the bead filler, and a distance Ph from the center of the bead core to the turned up end portion of the carcass layer and a distance Sho from the center of the bead core to the end portion of the steel reinforced layer satisfy a relationship $5.0 \text{ mm} \leq Ph-Sho$.

13. The pneumatic tire according to claim 1, wherein the bead filler comprises a hard filler layer located on the radially inner side and a soft filler layer located on the radially outer side, the hard filler layer has a 100% modulus B1M100 of from 6.0 MPa to 18.0 MPa, and the soft filler layer has a 100% modulus B2M100 of from 1.0 MPa to 6.0 MPa.

14. The pneumatic tire according to claim 1, comprising a load index of 121 or more on a single wheel, or a ply rating of 10 PR or more.

* * * * *